(12) United States Patent
Tucker

(10) Patent No.: US 11,187,374 B2
(45) Date of Patent: Nov. 30, 2021

(54) SYSTEMS AND METHODS ASSOCIATED WITH A HOLDING DEVICE

(71) Applicant: Augustine Tucker, Austin, TX (US)

(72) Inventor: Augustine Tucker, Austin, TX (US)

(*) Notice: Subject to any disclaimer, the term of this patent is extended or adjusted under 35 U.S.C. 154(b) by 0 days.

(21) Appl. No.: 16/724,464

(22) Filed: Dec. 23, 2019

(65) Prior Publication Data

US 2020/0256509 A1 Aug. 13, 2020

Related U.S. Application Data

(60) Provisional application No. 62/804,384, filed on Feb. 12, 2019.

(51) Int. Cl.
*F16M 13/02* (2006.01)
*A47F 5/00* (2006.01)
*A47G 25/06* (2006.01)

(52) U.S. Cl.
CPC ......... *F16M 13/022* (2013.01); *A47F 5/0006* (2013.01); *A47G 25/0678* (2013.01)

(58) Field of Classification Search
CPC ... A47G 25/0678; A47F 5/0006; A47K 10/12; F16M 13/022
USPC ............ 160/126, 123, 348, 330, 349.1, 108; 248/215
See application file for complete search history.

(56) References Cited

U.S. PATENT DOCUMENTS

| | | | | |
|---|---|---|---|---|
| 355,491 A * | 1/1887 | Wiley | ...................... | H02G 7/10 248/61 |
| 1,272,273 A * | 7/1918 | Kell | ...................... | A47G 1/18 248/328 |
| 1,747,892 A * | 2/1930 | Fisher | ...................... | A47G 33/10 248/317 |
| 2,357,478 A * | 9/1944 | Koch | ...................... | F16G 11/046 24/600.9 |
| 2,936,076 A * | 5/1960 | Harris | ...................... | A47K 3/281 211/113 |
| 2,951,672 A | 9/1960 | Bott | | |
| 5,084,919 A * | 2/1992 | Bittel, Sr. | ............... | E04H 4/144 182/106 |
| 5,275,225 A * | 1/1994 | Marasco | ................ | A47H 13/14 16/108 |
| 5,553,823 A | 9/1996 | Protz, Jr. | | |
| 5,613,656 A * | 3/1997 | Protz, Jr. | .................. | H02G 7/08 24/115 F |
| 5,639,049 A * | 6/1997 | Jennings | .................. | F16L 3/123 24/563 |
| 5,913,479 A | 6/1999 | Westwood | | |
| 5,957,416 A * | 9/1999 | Sellati | ...................... | H02G 3/26 248/58 |
| 6,000,739 A | 12/1999 | Zemit | | |
| 6,070,773 A * | 6/2000 | Pogoda | .................. | A47G 25/18 223/88 |
| D462,172 S | 9/2002 | Aurelio, Jr. | | |
| 7,322,554 B2 | 1/2008 | Caroselli | | |
| 7,448,582 B2 | 11/2008 | Jackson | | |
| 7,566,292 B1 | 7/2009 | Hauser et al. | | |

(Continued)

FOREIGN PATENT DOCUMENTS

FR 995555 A * 12/1951 ......... A47G 25/0678

*Primary Examiner* — Kimberly T Wood
(74) *Attorney, Agent, or Firm* — Pierson Intellectual Property LLC

(57) ABSTRACT

Systems and methods for a holding device. More specifically, embodiments are related to a holding device that is configured to secure a soft good.

2 Claims, 4 Drawing Sheets

(56) References Cited

U.S. PATENT DOCUMENTS

| | | |
|---|---|---|
| 7,878,379 B2 | 1/2011 | Murphy, Jr. |
| 10,722,016 B2 * | 7/2020 | Hughes .................. A45C 13/30 |
| 2003/0038220 A1 | 2/2003 | Catan |
| 2005/0076742 A1 * | 4/2005 | Yurek, Jr. .................. B67B 7/24 |
| | | 81/3.55 |
| 2006/0124811 A1 | 6/2006 | Tatarsky |
| 2007/0130734 A1 | 6/2007 | Handel |
| 2009/0108035 A1 | 4/2009 | Obenauf |
| 2014/0197294 A1 | 7/2014 | Kljajic |
| 2014/0265385 A1 | 9/2014 | Seifried |

* cited by examiner

SYSTEMS AND METHODS ASSOCIATED WITH A HOLDING DEVICE

BACKGROUND INFORMATION

Field of the Disclosure

Examples of the present disclosure are related to systems and methods for a holding device. More specifically, embodiments are related to a holding device that is configured to hold soft goods, wherein a first end of the holding device is configured to hold soft goods and a second end of the holding device is configured to be coupled to a pipe.

Background

Theater drapes and stage curtains are large pieces of cloth that are designed to mask backstage areas of a theater from spectators and also create scenery. In a majority of theatrical and entertainment settings, these soft goods are tied onto pipes, trusses, etc. that are able to be moved vertically within the theater. Conventionally, when a soft good is to be removed from a pipe, the pipe is lowered with a large number of crew members spread out under the pipe to catch the attached soft good. The soft good is then untied from the pipe by the crew members.

However, this is ineffective and inefficient because crew members holding the soft good are unable to simultaneously untie the soft goods while holding the soft good.

Accordingly, needs exist for systems and methods for a holding device that is configured to hold soft goods, wherein a first end of the holding device is configured to be secured to a pipe and a second end of the holding device is configured to hold the soft goods.

SUMMARY

Embodiments described herein disclose a holding device that is configured to hold soft goods, while transferring the load to a pipe. The holding device may include a first end, slanted sidewall, second end, and gusset.

The first end of the holding device may be a substantially semi-circular hook that is configured to hold and secure a soft good. In embodiments, a diameter of the first end may be approximately eighteen inches.

The slanted sidewall may be positioned between the first end and the second end. A first end of the slanted sidewall may be coupled with the first end of the holding device, and a second end of the slanted sidewall may be coupled with the second end of the holding device. The slanted sidewall may be angled to align a center of the second end with an apex of the first end when the holding device is positioned on a pipe. The slanted sidewall may have a length that is approximately sixteen inches long. In embodiments, a handle may be positioned on an outer surface of the slanted sidewall. The handle may be configured to allow a user to hold and tilt the holding device. When the holding device is tilted, the slanted sidewall may be positioned perpendicular to a ground level.

The second end of the holding device may be configured to be positioned over a pipe, rod, etc., which may allow the weight of a soft good to be transferred to the pipe. In embodiments, when the second end is positioned over the pipe, a center of the second end may be vertically aligned with an apex of the first end, which may allow for even distribution of weight of the soft good within the bowl. The second end may have a diameter that is less than that of the first end.

The gusset may be welded to the first end and the slanted sidewall to provide support and disperse stress caused by the soft good in the first end. The gusset may be approximately six inches in length.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
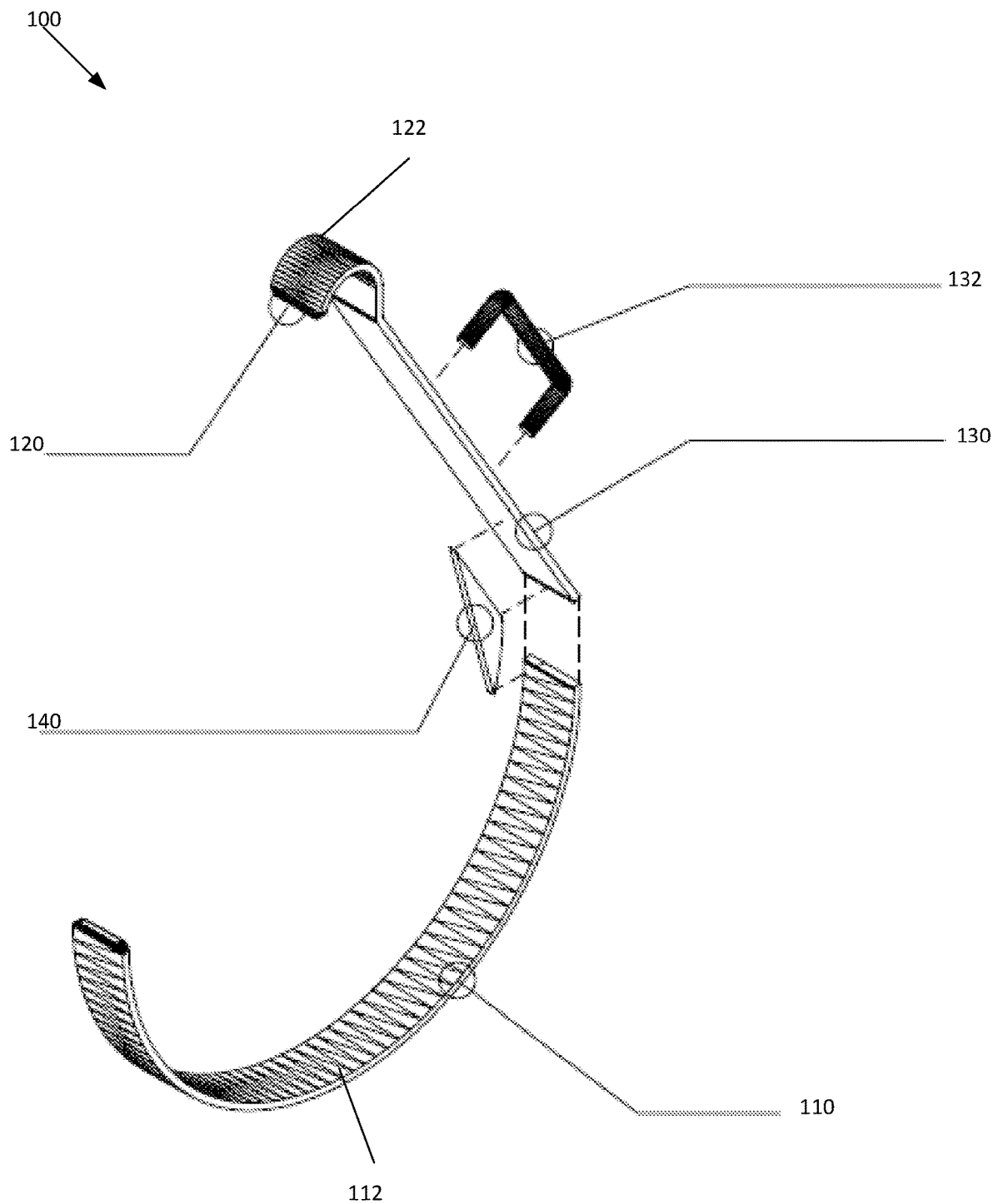
FIG. 1 depicts a holding device, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

FIG. 1 depicts a holding device 100, according to an embodiment. Holding device 100 may be configured to allow a border, soft good, etc. to be supported by a user and/or pipe. By utilizing holding device 100, transfer of soft goods may be safer, quicker, require fewer operators, and be more efficient. Holding device 100 may include a first end 110, second end 120, sidewall 130, and gusset 140.

First end 110 may be a bowl, semi-circle, container, etc. positioned on a distal end of holding device 100. First end 110 may have a diameter that is approximately eighteen inches, however in other embodiments the diameter of first end 110 may be greater or smaller.

Second end 120 may be a hook, "c-hook," hanger, etc. positioned on a proximal end of holding device 100. Second end 120 may be configured to be positioned around a pipe, rod, cylindrical structure, support structure. etc., which may be utilized to transfer the weight of the soft good to the pipe. A diameter of second end 120 may be less than the diameter of first end 110. For example, the diameter of second end 120 may be two inches. In embodiments, in a first mode of operation, a center or midpoint 122 of second end 120 may be configured to be vertically aligned in a plane with an apex or midpoint 112 of first end 110. In a second mode of operation, a center of second end 120 may be configured to be vertically aligned with a proximal and distal end of sidewall 130.

Sidewall 130 may be a device that is configured to couple first end 110 with second end 120. Sidewall 130 may be a body, beam, etc. with a distal end coupled with first end 110 and a proximal end coupled with second end 120. Sidewall 130 may be positioned at a convex angle. This may allow a center of second end 120 to be positioned over an apex of first end 110 in a first mode. In embodiments, sidewall 130 may have a length that is approximate to sixteen inches. In embodiments, a handle 132 may be positioned on an outer surface of sidewall 130. Handle 132 may be configured to allow a user to lift and secure holding device 100.

Gusset 140 may be welded onto first end 110 and sidewall 130 to provide support and disperse stress caused by the soft good. The gusset may be approximately six inches in length.

Figure 2:
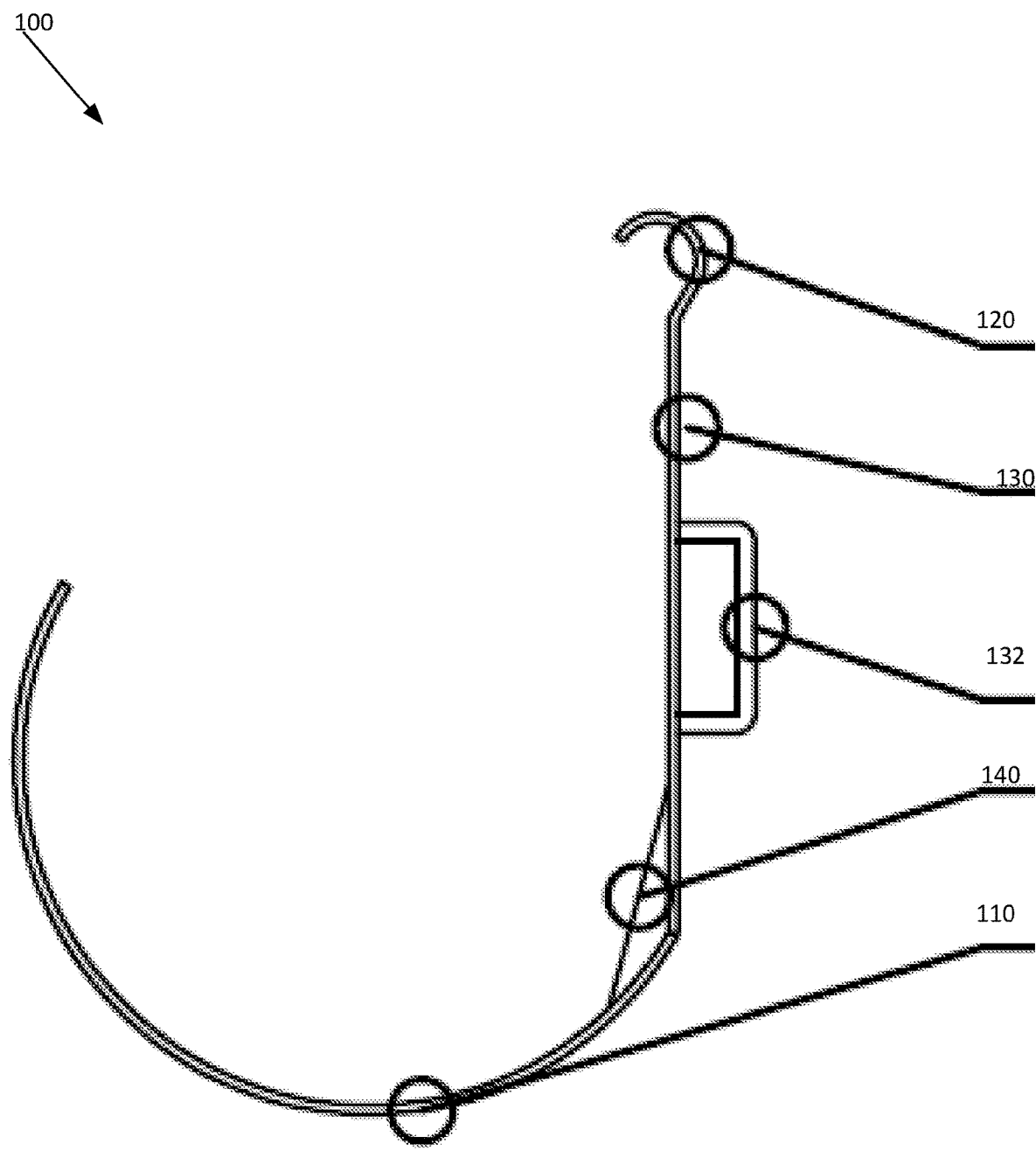
FIG. 2 depicts a holding device, according to an embodiment.

FIG. 2 depicts holding device 100 in a second mode of operation, according to an embodiment. Elements depicted in FIG. 2 may be described above, and for the sake of brevity, a further description of these elements is omitted.

When an operator is holding handle 132, the operator may position second end 120 to be vertically aligned with sidewall 130. This may expose an area between a distal end of first end 110 and sidewall 130, wherein the soft good may be positioned on first end 110 via the exposed area. As further depicted in FIG. 2, in the second mode of operation, the distal end of first end 110 may be positioned at a vertical offset that is somewhat aligned with a middle of handle 132, between the ends of sidewall 130. This may create a lip, rim, projection, etc. that limits the forward movement of the soft good while positioned on first end 110, while allowing the soft good to be positioned on first end 110.

Figure 3:
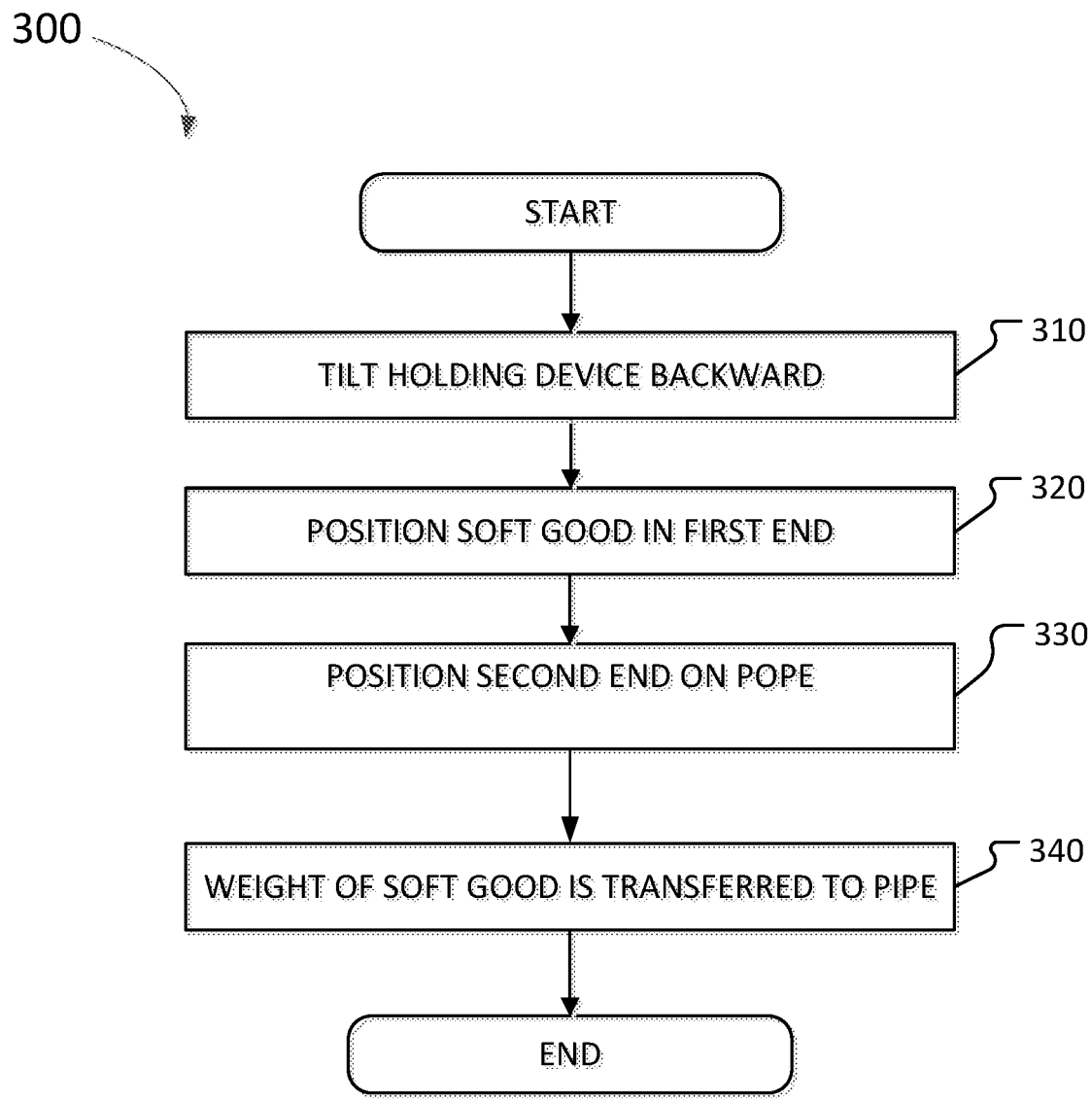
FIG. 3 depicts a method of using a holding device, according to an embodiment.
Figure 4:
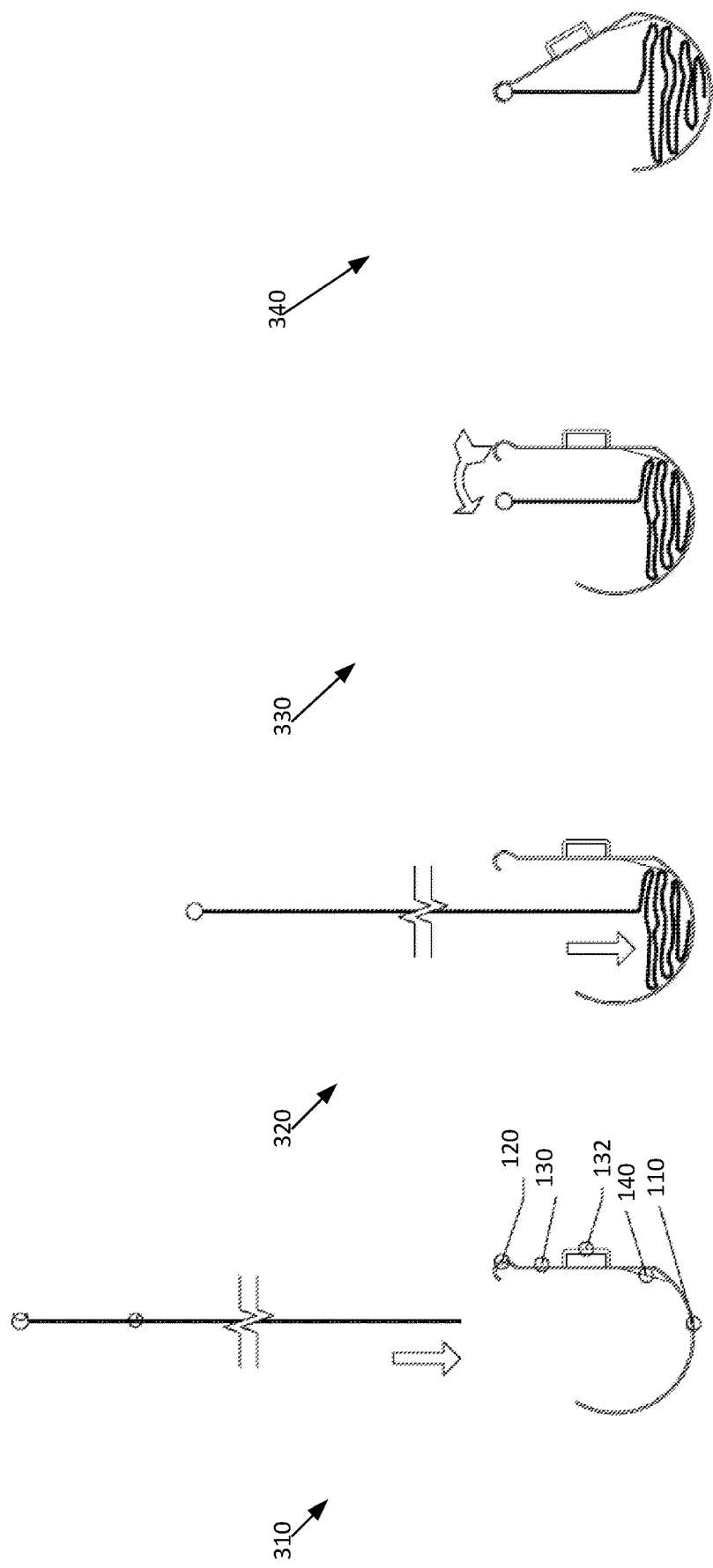
FIG. 4 depicts a method of using a holding device, according to an embodiment.

FIGS. 3-4 depict a method 300 of utilizing a holding device, according to an embodiment. The operations of the method depicted in FIGS. 3-4 are intended to be illustrative. In some embodiments, the method may be accomplished with one or more additional operations not described, and/or without one or more of the operations discussed. Additionally, the order in which the operations of the method are illustrated in FIGS. 3-4 and described below is not intended to be limiting. Elements depicted in FIGS. 3-4 may be described above. For the sake of brevity, a further description of these elements is omitted.

At operation 310, a holding device may be tilted backward. This may expose a channel between a first end of the holding device and a sidewall.

At operation 320, a soft good may be positioned on the first end of the holding device.

At operation 330, a second end of the holding device may be positioned over a pipe.

At operation 340, the weight of the soft good may be transferred from the holding device to the pipe. When the weight of the soft good is transferred to the pipe, a center of the second end of the holding device may be vertically aligned with an apex of the first end of the holding device.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

References throughout this specification to "one embodiment," "an embodiment" "one example," or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A holding device comprising:
   a first curve having a first proximal end, a first distal end, and a first apex, the first apex being positioned between the first proximal end and the first distal end, the first curve being semi-circular in shape and being one hundred eighty degrees;
   a second curve having a second proximal end, a second distal end, and a second apex, the second apex being positioned between the second proximal end and the second distal end, wherein the first curve and the second curve face each other, wherein a first diameter across the first curve is larger than a second diameter across the second curve;
   a slanted sidewall having a first sidewall end coupled to the first curve, the slanted sidewall having a second sidewall end coupled to the second curve, wherein the slanted sidewall is a planar sidewall, the slanted sidewall having a sidewall length;
   a convex angle positioned between the first curve and the first sidewall end, wherein the convex angle and the sidewall length vertically align the first apex and the second apex;
   a gusset extending from an inner surface of the first curve to an inner surface of the slanted sidewall, the gusset being configured to disperse forces applied to the first curve to the slanted sidewall, wherein the first curve includes a textured inner surface;

a handle positioned at a midway point of the slanted sidewall, the handle being positioned on an outer surface of the slanted sidewall, wherein in a storage position the second curve is coupled to a pipe, and in the storage position the first distal end of the first curve and the first proximal end of the first curve are aligned in a horizontal plane, and in a holding position the slanted sidewall is positioned in a plane perpendicular to a ground surface, and in the holding position the second distal end of the second curve is positioned further away from the ground surface than the second proximal end of the second curve.

2. A method for using a holding device, comprising:

positioning, in a storage position, a second curve around a pipe, the second curve having a second proximal end, a second distal end, and a second apex, the second apex being positioned between the second proximal end and the second distal end;

positioning, in the storage position, a soft good within a first curve of the holding device, the first curve having a first proximal end, a first distal end, and a first apex, the first apex being positioned between the first proximal end and the first distal end, the first curve being semi-circular in shape and being one hundred eighty degrees, wherein the first curve and the second curve face each other, wherein a first diameter across the first curve is larger than a second diameter across the second curve, wherein the holding device includes a slanted sidewall having a first sidewall end coupled to the first curve, the slanted sidewall having a second sidewall end coupled to the second curve, wherein the slanted sidewall is a planar sidewall having a sidewall length, the holding device having a convex angle positioned between the first curve and the first sidewall end, wherein the convex angle and the sidewall length vertically align the first apex and the second apex, the holding device also including a gusset extending from an inner surface of the first curve to an inner surface of the slanted sidewall, the gusset being configured to disperse forces applied to the first curve to the slanted sidewall, wherein the first curve includes a textured inner surface;

aligning, in the storage position, the first distal end of the first curve and the first proximal end of the first curve in a horizontal plane; and utilizing a handle to position the holding device in a holding position, the handle being positioned at a midway point on the outer surface of the slanted sidewall, wherein in the holding position the slanted sidewall is positioned in a plane perpendicular to a ground surface, and in the holding position the second distal end of the second curve is positioned further away from the ground surface than the second proximal end of the second curve.

\* \* \* \* \*